United States Patent
Lösch

(10) Patent No.: US 7,201,435 B2
(45) Date of Patent: Apr. 10, 2007

(54) ROOF MODULE FOR A MOTOR VEHICLE BODY

(75) Inventor: Alfred Lösch, Tholey Hasborn (DE)

(73) Assignee: Thyssenkrupp Drauz Nothelfer GmbH (DE)

( * ) Notice: Subject to any disclaimer, the term of this patent is extended or adjusted under 35 U.S.C. 154(b) by 93 days.

(21) Appl. No.: 10/527,442

(22) PCT Filed: Feb. 22, 2003

(86) PCT No.: PCT/EP03/01818

§ 371 (c)(1),
(2), (4) Date: Mar. 10, 2005

(87) PCT Pub. No.: WO2004/039655
PCT Pub. Date: May 13, 2004

(65) Prior Publication Data
US 2005/0269839 A1  Dec. 8, 2005

(30) Foreign Application Priority Data
Oct. 31, 2002   (DE) ............................. 102 51 175

(51) Int. Cl.
*B60J 7/00* (2006.01)
(52) U.S. Cl. ................... 296/210; 296/187.05
(58) Field of Classification Search ............... 296/210, 296/193.04, 185.1
See application file for complete search history.

(56) References Cited

U.S. PATENT DOCUMENTS

| 2,976,972 A | * | 3/1961 | Raymond | 52/718.01 |
| 3,610,681 A | * | 10/1971 | Trenkler | 296/218 |
| 4,275,919 A | * | 6/1981 | Okamoto et al. | 296/214 |
| 4,337,974 A | * | 7/1982 | Kohlpaintner et al. | 296/213 |

(Continued)

FOREIGN PATENT DOCUMENTS

DE    198 53 820 A1    5/2000

*Primary Examiner*—Kiran B. Patel
(74) *Attorney, Agent, or Firm*—McGlew & Tuttle, PC

(57) ABSTRACT

A roof module for a motor vehicle body (3) includes a reinforcing frame (2) and a roof panel (1) that is fastened thereto. The reinforcing frame (2) can be fastened to the motor vehicle body (3) by screw connections (8) and adhesive bonds (5). A roof module, which is both prefabricated with all accessories as well as painted and which can be placed onto the motor vehicle body (3) during final assembly is provided with the reinforcing frame (2) or the roof panel (1) having, on the edge thereof, a folded flange (11), which is shaped so that it has a U-shaped profile (12). An edge strip (10, 13) of the roof panel (1) or of the reinforcing frame (2) engages inside the U-shaped profile (12) and is bonded therein to the reinforcing frame (2) or to the roof panel (1). The roof module is larger in a vertical projection than a roof opening in the motor vehicle body (3).

13 Claims, 6 Drawing Sheets

U.S. PATENT DOCUMENTS

| | | | |
|---|---|---|---|
| 4,516,804 A * | 5/1985 | Yamawaki et al. | 296/210 |
| 4,575,147 A * | 3/1986 | Ui et al. | 296/213 |
| 4,606,573 A * | 8/1986 | Schneider | 296/210 |
| 4,767,154 A * | 8/1988 | Okamoto et al. | 296/210 |
| 4,834,448 A * | 5/1989 | Sakamoto et al. | 296/210 |
| 4,957,326 A * | 9/1990 | Chiba et al. | 296/210 |
| 5,238,282 A * | 8/1993 | Watson et al. | 296/24.41 |
| 5,349,801 A * | 9/1994 | Verbofsky | 52/518 |
| 5,443,297 A * | 8/1995 | Tanaka et al. | 296/203.03 |
| 5,681,076 A * | 10/1997 | Yoshii | 296/210 |
| 5,730,446 A * | 3/1998 | Taylor et al. | 277/312 |
| 5,735,569 A * | 4/1998 | Takagi et al. | 296/210 |
| 5,783,298 A * | 7/1998 | Herring et al. | 428/323 |
| 6,103,984 A * | 8/2000 | Bowers et al. | 280/730.2 |
| 6,173,546 B1 * | 1/2001 | Schafer | 52/519 |
| 6,199,941 B1 * | 3/2001 | Takahara et al. | 296/187.05 |
| 6,254,123 B1 * | 7/2001 | Urushi et al. | 280/730.2 |
| 6,267,436 B1 * | 7/2001 | Takahara | 296/187.05 |
| 6,293,614 B1 * | 9/2001 | Takahara et al. | 296/187.05 |
| 6,333,515 B1 * | 12/2001 | Kubota et al. | 280/730.2 |
| 6,440,257 B1 * | 8/2002 | Zhou et al. | 156/307.3 |
| 6,616,221 B2 * | 9/2003 | Lumpe et al. | 296/210 |
| 6,672,655 B2 * | 1/2004 | Zinsmeister et al. | 296/210 |
| 6,887,914 B2 * | 5/2005 | Czaplicki et al. | 521/178 |
| 7,004,536 B2 * | 2/2006 | Wieber | 296/210 |
| 7,021,704 B2 * | 4/2006 | Ortega et al. | 296/210 |
| 7,125,461 B2 * | 10/2006 | Czaplicki et al. | 156/79 |
| 2002/0140253 A1 * | 10/2002 | Lumpe et al. | 296/210 |
| 2004/0079478 A1 * | 4/2004 | Merz | 156/275.7 |

* cited by examiner

ROOF MODULE FOR A MOTOR VEHICLE BODY

CROSS REFERENCE TO RELATED APPLICATIONS

This application is a U.S. National Phase application of International Application PCT/EP2003/001818 and claims the benefit of priority under 35 U.S.C. § 119 of German Application DE 102 51 175.6 filed Oct. 31, 2002, the entire contents of which are incorporated herein by reference.

FIELD OF THE INVENTION

The invention relates to a roof module for a motor vehicle body comprising a reinforcing frame and a roof panel that is fastened thereto, wherein said reinforcing frame can be fastened to the motor vehicle body by means of screw connections and adhesive bonds.

BACKGROUND OF THE INVENTION

Roof modules for motor vehicle bodies are known in different versions. A prior art version (DE 198 53 820 A1) is introduced as a prefabricated component, which various accessories are mounted to, through the front window opening into the car body and placed from inside against the roof opening and fastened there. The completion of the car body interior is performed subsequently, with it being required to temporarily hang-out motor vehicle body side doors possibly installed already before.

In another version (DE 100 48 130 A1) the roof module features foldable edge strips that are transfolded to be able to introduce the roof module through a roof opening into the motor vehicle body. Subsequently the edge strips are unfolded again and the roof module is placed from inside against the motor vehicle body and fastened there. All this is too costly.

SUMMARY OF THE INVENTION

Now, therefore, it is the task of the present invention to provide a prefabricated and lacquered roof module equipped with all accessories that can be put onto the motor vehicle body during final assembly.

This task is solved by a roof module of the species described hereinabove in that the reinforcing frame or roof panel at its edge has a folded flange shaped to a U section, and that an edge strip of the roof panel or reinforcing frame engages into the U section and is bonded there to the reinforcing frame or roof panel, and that the roof module in a vertical projection is greater than a roof opening in the motor vehicle body. The roof panel and the reinforcing frame may be comprised of pretreated and prelacquered metal sheets (coil coating) so that the supplier needs no lacquer coating units. Furthermore, the roof module may be provided with all the desired accessories both inside and outside. The roof module is not put on in a raw construction state, i.e. before the motor vehicle body is lacquered, but only during final assembly onto an appropriately modified motor vehicle body. The relatively large roof opening, too, facilitates thus the assembly of the interior outfit of the motor vehicle body and of the instrumentation panel, and the usual temporary disassembly of side doors, if any, may be dispensed with.

It is recommendable to seal an external joint between the folded flange and the roof panel.

Additional covering and cladding elements are not required, if the proposed procedure is observed.

The U section may have a support for the front window outside in the area of a front window. In this connection, the roof panel may be provided with a step in the area of the front window, whose height roughly corresponds to the thickness of the front window.

Furthermore, the U section may have a support in the door area for the side windows and/or a window pane seal co-acting with the side windows. In this connection, the roof panel in the door area may preferably have a step, whose height roughly corresponds to the thickness of the side window and/or window pane seal.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
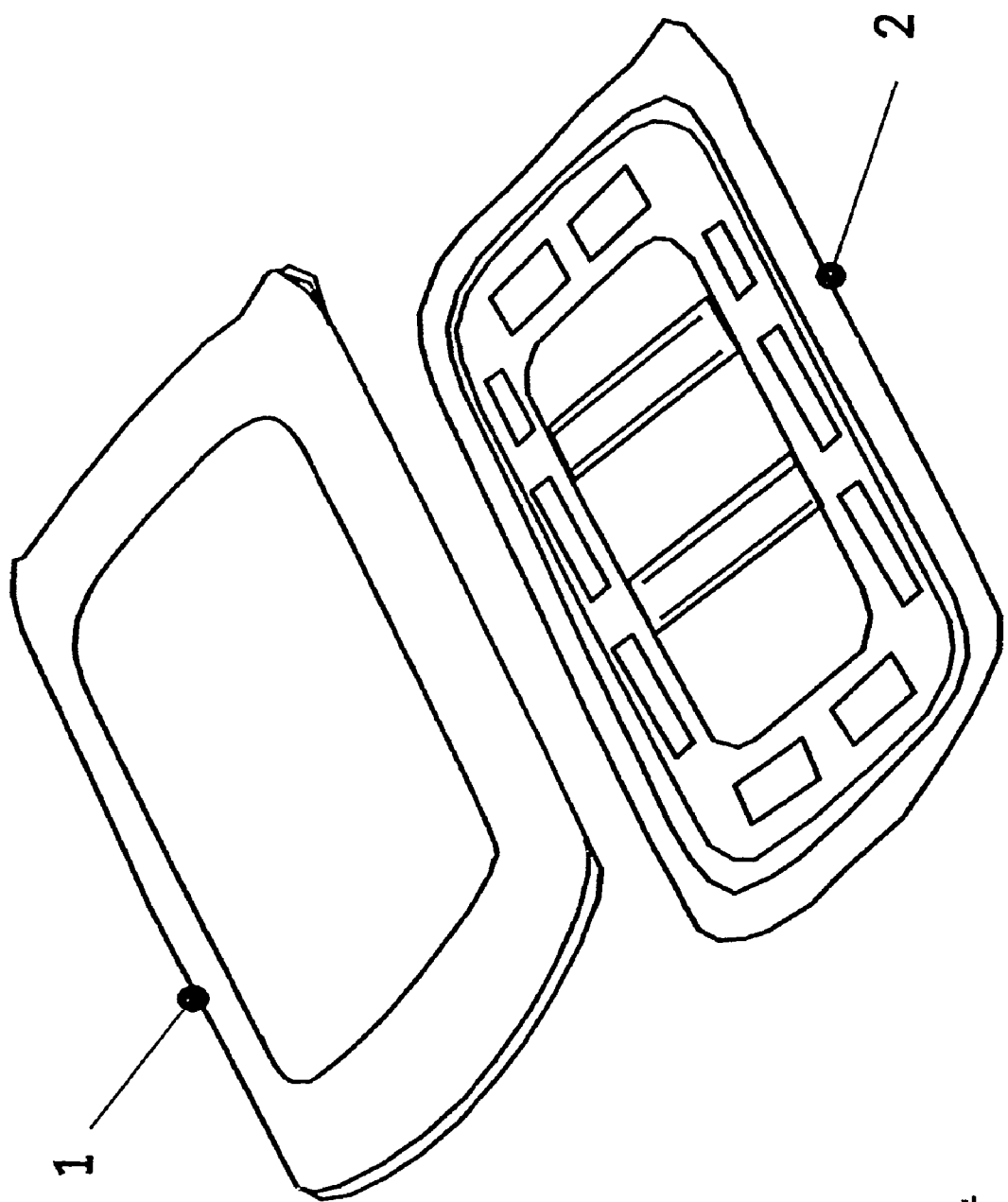
FIG. 1 is a schematic view of a roof panel and of a reinforcing frame not yet connected to it.

Referring to the drawings in particular, a roof panel 1 and a reinforcing frame 2 belong to the depicted roof module (FIG. 1).

In FIGS. 2 to 6, the same reference symbols designate the same parts. The reinforcing frame 2 or the roof panel 1 have a circumferential edge strip 10 and/or 13, as well as a folded flange 11 connected thereto. The folded flange 11 is transfolded over the edge strip 10 and/or 13 and together they form a U section 12. An edge strip 10 and/or 13 of the roof panel 1 and/or reinforcing frame 2 engage into the U-section 12 which is bonded with the edge strip 10 and/or 13 via a structural bonding. The external joint between folded flange 11 and edge strip 10 and/or 13 of roof panel 1 or reinforcing frame 2 is sealed with a sealing 6 to provide protection from corrosion. A shaped step 4 of roof panel 1 connects to edge strip 13, so that a support 14 connected to shaped step 4 is mainly flush to the transfolded folded flange 11.

The roof module is fastened in a usual manner with adhesive bonds 5 and screw connections 8 to the motor vehicle body 3.

Figure 2:
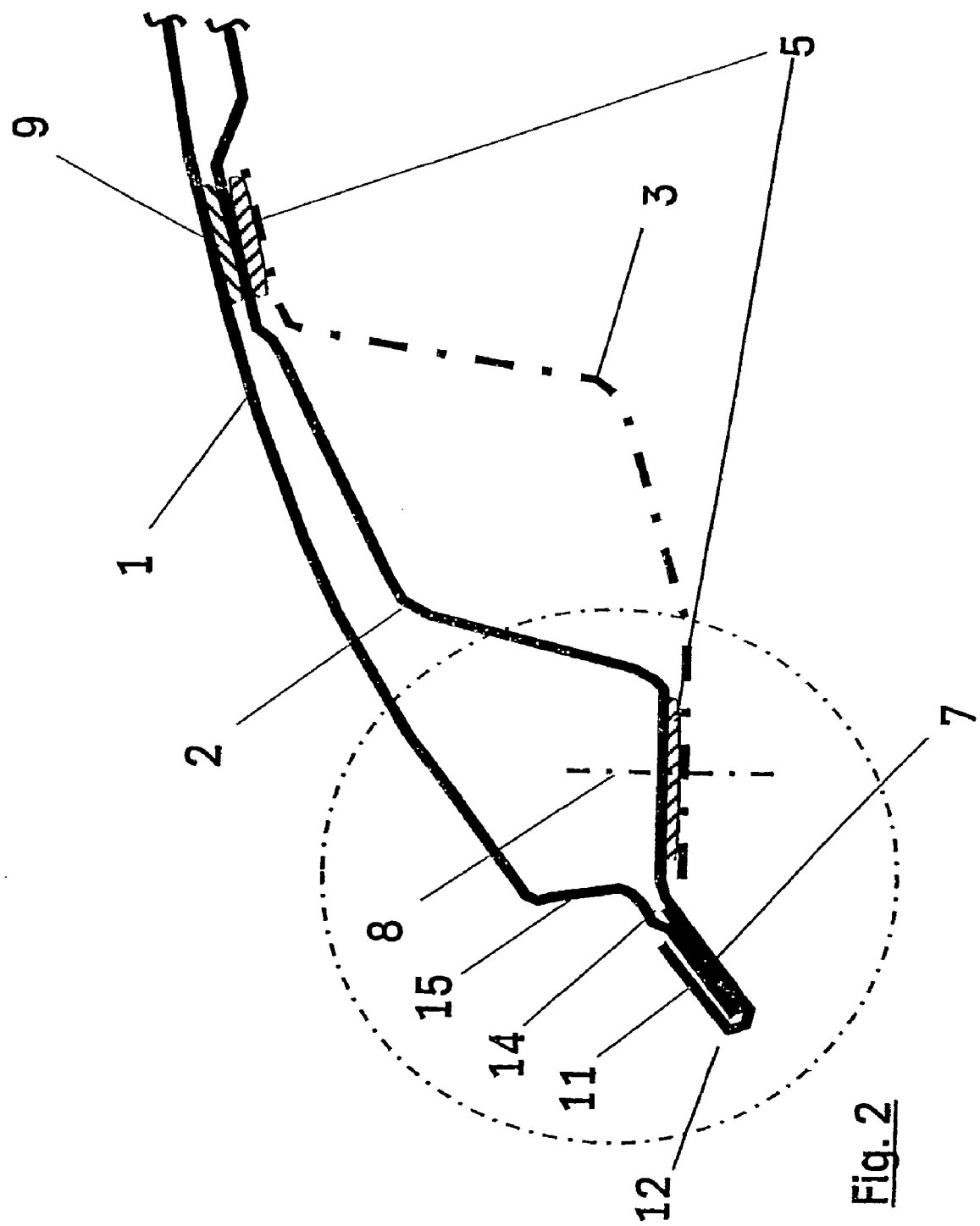
FIG. 2 is a vertical sectional view in the area of a front window of a roof module connected to a motor vehicle body.
Figure 3:
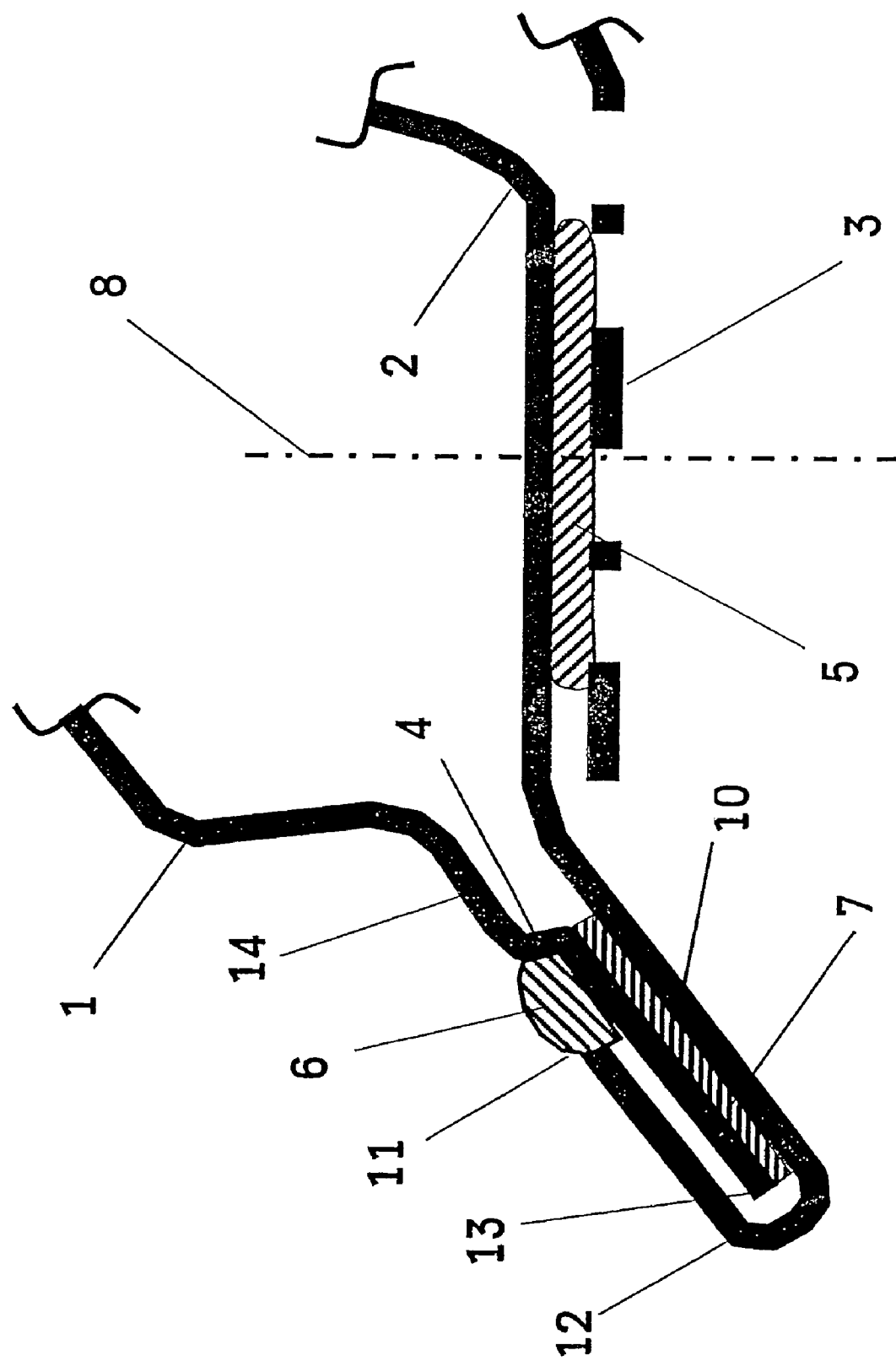
FIG. 3 is an enlarged detail view of the object according to FIG. 2.

FIG. 2 and FIG. 3 depict the roof module fastened to the motor vehicle body 3 in the area of the front window. Roof panel 1 and reinforcing frame 2 are supported against each other via an adhesive bond 9 at some distance from the edge area. In connection to support 14, roof panel 1 has a step 15, whose height roughly corresponds to the thickness of a non-depicted front window, so that roof panel 1 is mainly flush outside to a front window fastened at the edge side on support 14.

Figure 4:
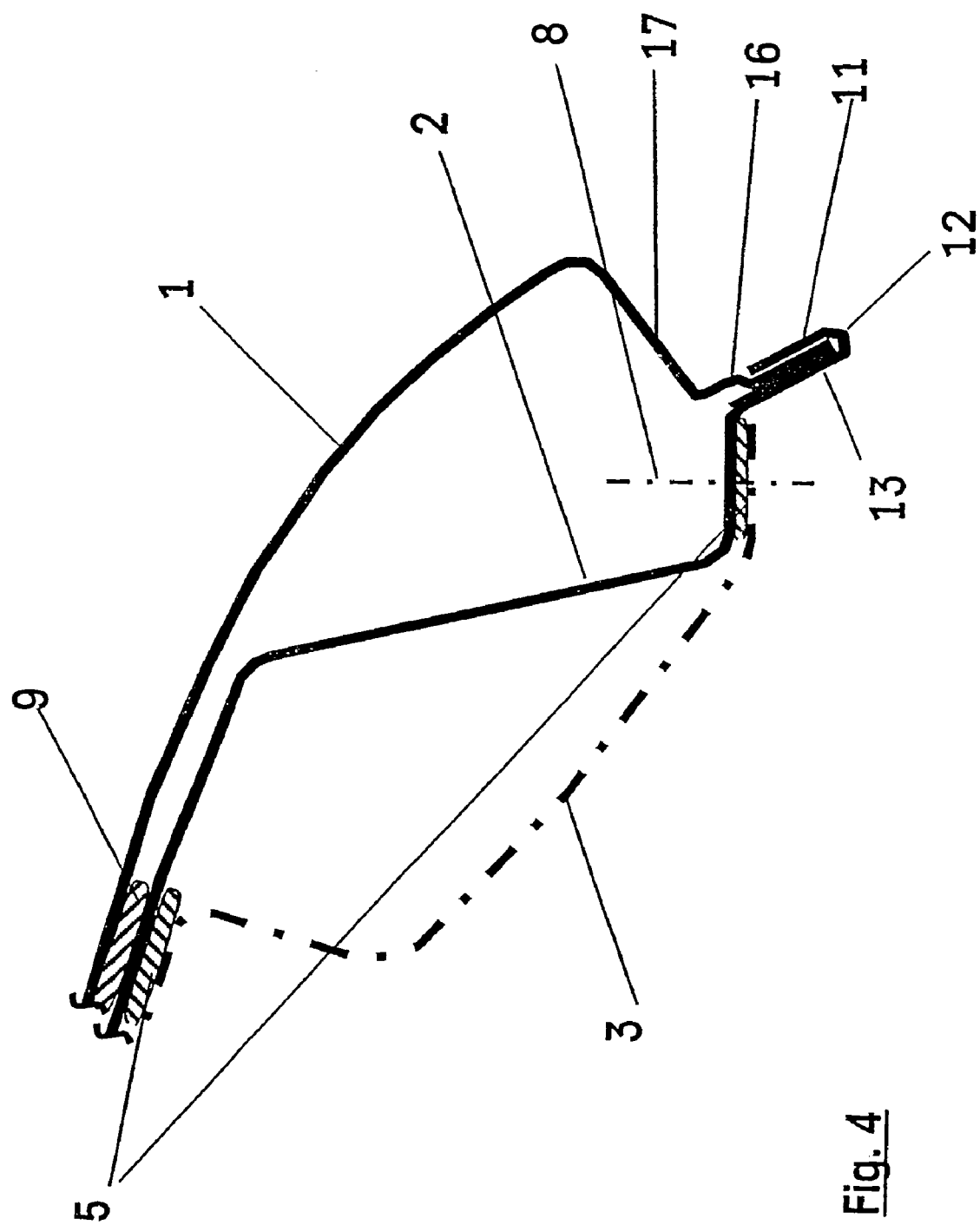
FIG. 4 is a corresponding vertical sectional view in the door area.

FIG. 4 shows a vertical section through the roof module in the door area, which is connected to the motor vehicle body 3. Here, too, the edge strip 13 of roof panel 1 passes via a shaped step into a support 16, which step 17 is connected to. Support 16 is provided for a non-depicted side door window and/or the pertaining window pane seal. Step 17 has a height that roughly corresponds to the thickness of the side door window pane and/or window pane seal.

Figure 5:
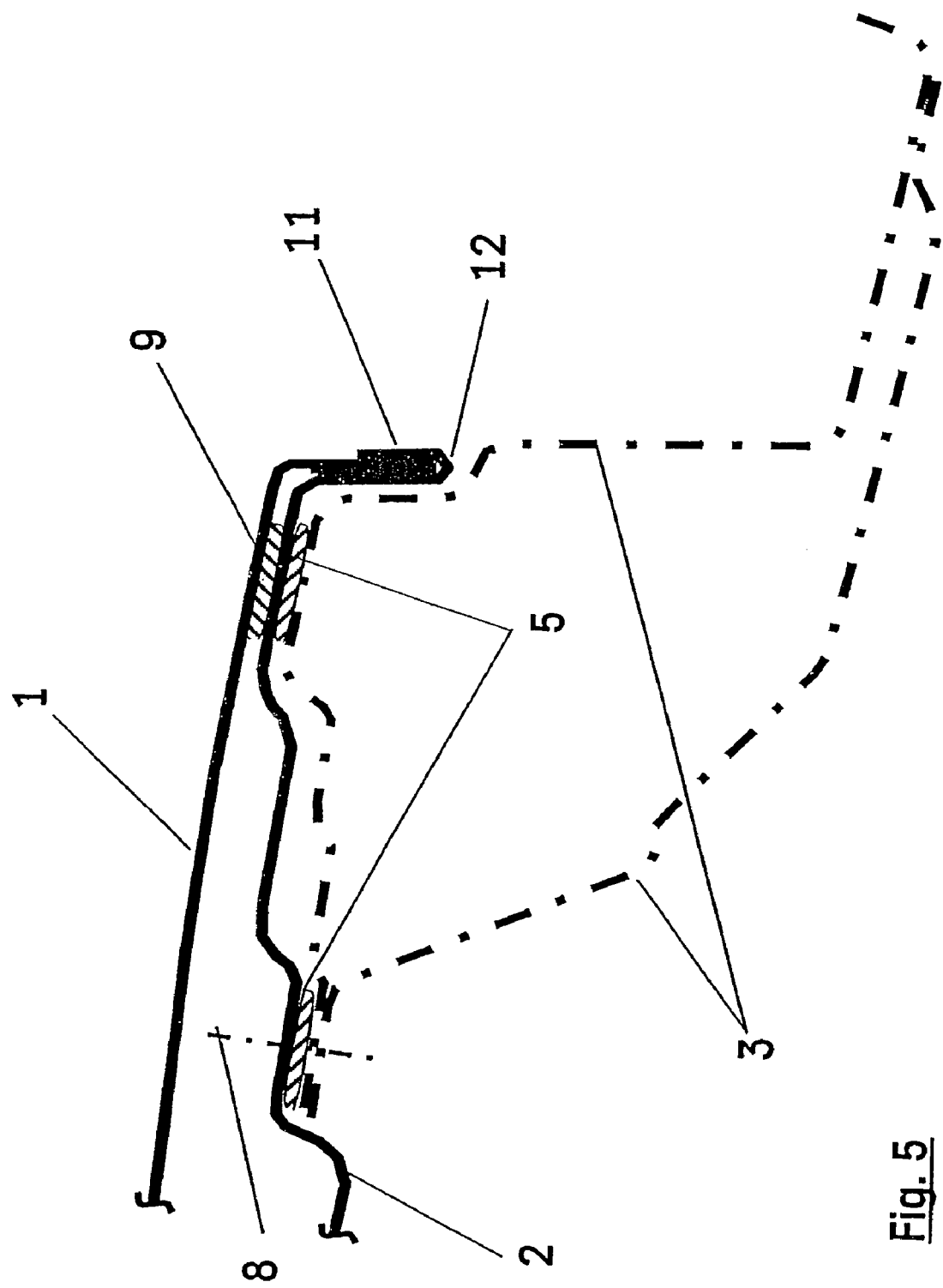
FIG. 5 is a corresponding vertical sectional view in the area of a rear flap.

FIG. 5 shows the configuration of roof panel 1 in the area of a non-depicted rear flap, with the step in the roof panel being dispensed with.

Figure 6:
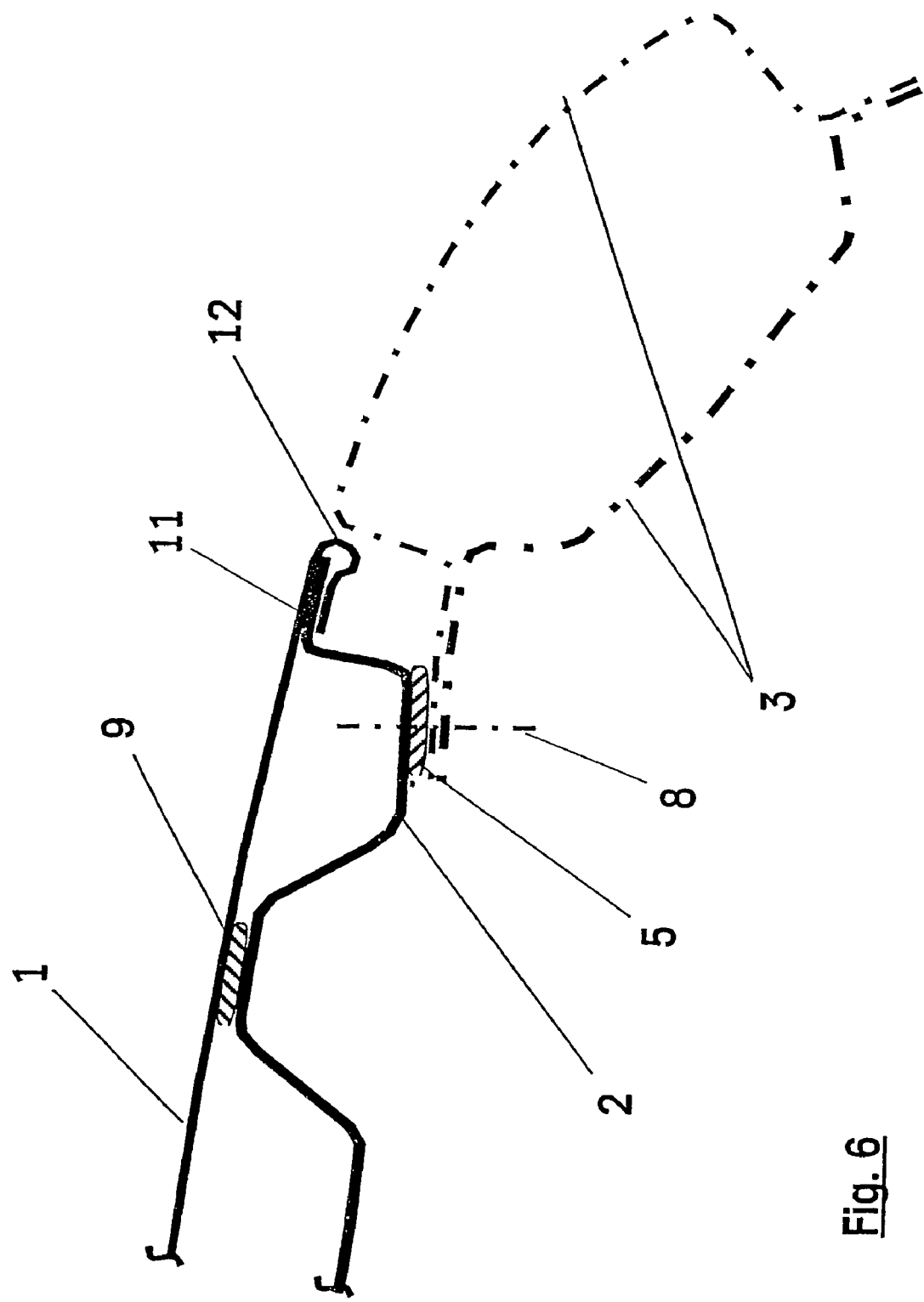
FIG. 6 is a corresponding vertical sectional view in the door area with another embodiment.

FIG. 6 shows a vertical section through the roof module in the door area connected to motor vehicle body 3. Here, the edge of roof panel 1 is folded over the edge strip of reinforcing frame 2.

By way of the measures described hereinabove, the connection of roof panel 1 to the reinforcing frame 2 is made invisible and/or sealed in all areas.

The roof module can be put onto and fastened to the motor vehicle body 3 in the course of final assembly, after the interior outfit has been introduced through the existing large roof opening into an appropriately modified motor vehicle body and installed there.

While specific embodiments of the invention have been shown and described in detail to illustrate the application of the principles of the invention, it will be understood that the invention may be embodied otherwise without departing from such principles.

The invention is claimed is:

1. A roof module for a motor vehicle body, the roof module comprising:
   a reinforcing frame; and
   a roof panel fastened to said reinforcing frame said reinforcing frame or said roof panel having a folded flange at an edge of a U section, and an edge strip of the roof panel or reinforcing frame engages into said U section, said edge strip being bonded to the reinforcing frame or roof panel, wherein a joint is defined by said folded flange of said reinforcing frame or said roof panel and by said roof panel or said reinforcing frame, said joint being sealed by a sealing piece, said reinforcing frame having a screw connection located at a screw location and bond pads located at a bond location for fastening said motor reinforcing body to the motor vehicle body, whereby a prefabricated and painted roof module is placed on the bonding location and is connected to the vehicle body by said screw connection from inside said motor vehicle, said roof panel covering an area that is greater than a roof opening in the motor vehicle body.

2. A roof module pursuant to claim 1, wherein said U section has a support for a front window, said support being located in an area of said front window.

3. A roof module pursuant to claim 2, wherein said roof panel has a step located in an area of said front window, said step having a height corresponding to a thickness of said front window.

4. A roof module pursuant to claim 1, wherein said U section has a support for a side window and/or side window pane seal, said support being located in a door area.

5. A roof module pursuant to claim 4, wherein said roof panel in the door area has a step, said step having a height corresponding to a thickness of the side window and/or side window pane seal.

6. A roof module pursuant to claim 1, wherein said roof panel and/or reinforcing frame are comprised of pretreated and/or prelacquered metal sheets.

7. A roof module for assembly with a motor vehicle body having a roof opening, the roof module comprising:
   a reinforcing frame;
   a roof panel fastened to said reinforcing frame, one of said reinforcing frame and said roof panel having a folded flange at an edge of a U section with an inner surface and the other of said reinforcing frame and said roof panel having an edge strip engaging into said U section, said edge strip having a first surface and an opposite second surface, said first surface being disposed opposite said inner surface and bonded to said inner surface; and
   sealing material in contact with said folded flange and said second surface to form a sealing joint between said folded flange and said edge strip, said reinforcing frame having a screw location and bond pads located at a bond location for fastening said reinforcing body to the motor vehicle body, whereby a prefabricated and painted roof module is placed on the bonding location and is connected to the vehicle body by said screw connection from inside said motor vehicle, said roof panel having an area that is greater than the area of a roof opening.

8. A roof module pursuant to claim 7, wherein said U section has a support for the front window, said support being located in an area of a front window.

9. A roof module pursuant to claim 8, wherein said roof panel has a step located in an area of a front window, said step having a height corresponding to the thickness of the front window.

10. A roof module pursuant to claim 7, wherein said U section has a support for the side window and/or side window pane seal, said support being located in a door area.

11. A roof module pursuant to claim 4, wherein said roof panel has a step located in the door area, said step having a height corresponding to the thickness of the side window and/or side window pane seal.

12. A roof module pursuant to claim 7, wherein said roof panel and/or reinforcing frame are comprised of pretreated and/or prelacquered metal sheets.

13. The combination of a roof module and a vehicle body having a roof opening, the combination comprising:
   a vehicle body having a roof opening, said vehicle body having a screw place and a bond place;
   a prefabricated and painted roof module including a reinforcing frame and a roof panel fastened to said reinforcing frame, one of said reinforcing frame and said roof panel having a folded flange at an edge of a U section with an inner surface and the other of said reinforcing frame and said roof panel having an edge strip engaging into said U section, said edge strip having a first surface and an opposite second surface, said first surface being disposed opposite said inner surface and bonded to said inner surface, and sealing material in contact with said folded flange and said second surface to form a sealing joint between said folded flange and said edge strip, said reinforcing frame having a screw location and bond pads located at a bond location; and
   screws connecting said roof module to said vehicle body, said screws being connected from inside said vehicle body; and
   adhesive connecting said bond location of said reinforcing frame to said bond place of said motor vehicle body, said roof panel having an area that is greater than the area of the roof opening.

* * * * *